(12) United States Patent
Imai

(10) Patent No.: US 9,948,198 B2
(45) Date of Patent: Apr. 17, 2018

(54) RESONANT CONVERTER AND SWITCHING POWER SUPPLY DEVICE

(71) Applicant: TDK CORPORATION, Tokyo (JP)

(72) Inventor: Katsunori Imai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/153,041

(22) Filed: May 12, 2016

(65) Prior Publication Data

US 2016/0352234 A1  Dec. 1, 2016

(30) Foreign Application Priority Data

May 12, 2015  (JP) ................................. 2015-096990

(51) Int. Cl.
| H02M 3/158 | (2006.01) |
| H02M 3/335 | (2006.01) |
| H02M 3/337 | (2006.01) |
| H02M 7/48 | (2007.01) |
| H02M 1/00 | (2006.01) |

(52) U.S. Cl.
CPC .......... H02M 3/337 (2013.01); H02M 3/158 (2013.01); H02M 2001/007 (2013.01); H02M 2001/0058 (2013.01); Y02B 70/1425 (2013.01); Y02B 70/1433 (2013.01); Y02B 70/1491 (2013.01)

(58) Field of Classification Search
CPC ......... H02M 3/158; H02M 2007/4815; H02M 2007/4818; H02M 3/33538; H02M 3/33546; H02M 3/33553; H02M 3/337; H02M 2001/0058
See application file for complete search history.

(56) References Cited

U.S. PATENT DOCUMENTS

| 5,159,541 | A | * | 10/1992 | Jain | ................... | H02M 3/33569 |
| | | | | | | 363/131 |
| 5,600,547 | A | | 2/1997 | Kim | | |
| 6,992,902 | B2 | * | 1/2006 | Jang | .................... | H02M 7/5387 |
| | | | | | | 363/132 |
| 8,400,788 | B2 | | 3/2013 | Hansson | | |
| 9,502,987 | B1 | * | 11/2016 | Feno | ................. | H02M 3/33546 |
| 2011/0051465 | A1 | * | 3/2011 | Usui | .................... | H02M 3/337 |
| | | | | | | 363/21.02 |
| 2011/0103097 | A1 | * | 5/2011 | Wang | ................ | H02M 3/33592 |
| | | | | | | 363/17 |
| 2012/0206946 | A1 | | 8/2012 | Sagneri et al. | | |
| 2012/0307535 | A1 | * | 12/2012 | Kim | ..................... | H02M 3/158 |
| | | | | | | 363/125 |

(Continued)

FOREIGN PATENT DOCUMENTS

JP  4808814 B2  11/2011

*Primary Examiner* — Timothy J Dole
*Assistant Examiner* — Sisay G Tiku
(74) *Attorney, Agent, or Firm* — Oliff PLC

(57) ABSTRACT

A resonant inverter includes a first switch element and a second switch element that are alternately turned on and off, a first capacitor and a second capacitor, a first inverter section constituted by the first switch element and the first capacitor, and a second inverter section constituted by the second switch element and the second capacitor. A first coil and the first capacitor constitute a first resonant circuit included in the first inverter section, and the first coil and the second capacitor constitute a second resonant circuit included in the second inverter section, thereby forming a resonant converter.

18 Claims, 5 Drawing Sheets

(56) References Cited

U.S. PATENT DOCUMENTS

| | | | | |
|---|---|---|---|---|
| 2013/0083564 A1* | 4/2013 | Bai | H02M 3/33592 | 363/21.02 |
| 2013/0265804 A1* | 10/2013 | Fu | H02M 3/33576 | 363/17 |
| 2013/0301306 A1* | 11/2013 | Hosotani | H02M 3/338 | 363/21.02 |
| 2013/0301308 A1* | 11/2013 | Hosotani | H02M 3/3381 | 363/21.03 |
| 2014/0098574 A1* | 4/2014 | Hara | H02M 3/33592 | 363/21.02 |
| 2014/0112026 A1* | 4/2014 | Pan | H02M 3/33569 | 363/21.02 |
| 2014/0132231 A1* | 5/2014 | Tsai | H02M 3/155 | 323/223 |
| 2014/0139128 A1* | 5/2014 | Tsai | H02M 3/155 | 315/205 |
| 2014/0153289 A1* | 6/2014 | Kao | H02M 3/3376 | 363/17 |
| 2014/0153293 A1* | 6/2014 | Chang | H02M 3/3376 | 363/21.02 |
| 2014/0211515 A1* | 7/2014 | Tomioka | H02M 3/158 | 363/21.02 |
| 2014/0247625 A1* | 9/2014 | Hosotani | H02M 3/33569 | 363/17 |
| 2014/0268899 A1* | 9/2014 | Hosotani | H02M 3/33569 | 363/17 |
| 2015/0055374 A1* | 2/2015 | Yamashita | H02M 3/337 | 363/17 |
| 2015/0357922 A1* | 12/2015 | Lai | H02M 3/33592 | 363/21.02 |
| 2016/0241128 A1* | 8/2016 | Imai | H02M 7/537 | |
| 2016/0241163 A1* | 8/2016 | Imai | H02M 7/537 | |
| 2016/0322910 A1* | 11/2016 | Kovacevic | H02M 3/33576 | |
| 2016/0336865 A1* | 11/2016 | Imai | H02M 3/33546 | |
| 2016/0352235 A1* | 12/2016 | Imai | H02M 3/33569 | |
| 2016/0373015 A1* | 12/2016 | Deng | H02M 3/3376 | |
| 2017/0110973 A1* | 4/2017 | Chen | H02M 3/33546 | |

* cited by examiner

RESONANT CONVERTER AND SWITCHING POWER SUPPLY DEVICE

BACKGROUND OF THE INVENTION

1. Field of the Invention

The present invention relates to a resonant converter and a switching power supply device in which the operating voltage of switch elements included therein can be easily decreased.

2. Description of the Related Art

U.S. Pat. No. 5,600,547 discloses a step-down converter and a push-pull inverter coupled together as a constant-current control circuit for a backlight and also discloses a method in which the output voltage of the step-down converter is controlled by a pulse width modulation (PWM) circuit in accordance with the output current to thereby control the output current (see FIG. 8). In the disclosed method, switches in the push-pull inverter unit are alternately turned on and off with a phase difference of 180 degrees, and the push-pull inverter is not controlled. The output current is detected by a resistor as a voltage and is thereafter compared by an error amplifier. The output from the error amplifier is compared with a triangular wave, and the on-time of the step-down converter is controlled in accordance with the pulse width. Consequently, the output current control is performed by performing PWM control on the output voltage of the step-down converter. U.S. Pat. No. 8,400,788 discloses a step-down converter and a push-pull inverter coupled together and used for an ozone generating device (see FIG. 9). The disclosed inverter has a capacitive load, and a resonant circuit is formed of the inductance of a transformer and the capacitance of the load. Zero-crossings of the voltage are sensed by an auxiliary winding to thereby control the on-time of the step-down converter. Switches in the push-pull inverter section are alternately turned on and off with a phase difference of 180 degrees, and the push-pull inverter is not controlled. It is also disclosed that the step-down converter has a drive frequency twice the operating frequency of the push-pull inverter and is in synchronization with the rising edge. As described above, in the related art, in a case where a step-down converter and a push-pull inverter are coupled together, the push-pull inverter section is not controlled, and control is performed in accordance with the on-time of the step-down converter section.

Japanese Patent No. 4808814 discloses a push-pull inverter in which the operating voltage of switches included therein can be decreased by using Class EF2 inverters. In a disclosed method, an inverter section includes a first resonator section, a second resonator section, and a third resonator section, the second resonator section includes a pair of coils and a shared capacitor, the coils are configured to control the impedance at odd harmonics, and the shared capacitor is adjusted to control the impedance at even harmonics without affecting the impedance at odd harmonics. Accordingly, the operating voltage of the switches is decreased by specifying the impedance upon switch off. U.S. Patent Application Publication No. 2012/0206946 discloses a method for voltage control using burst control instead of PWM control. This patent literature discloses a technique in which burst control is used for a converter operating at a high frequency because it is difficult to perform PWM control on such a converter. In the disclosed method, an ENABLE signal of gate drivers of inverter switches is a control target of burst control, and the output voltage is controlled accordingly. As described above, in the related art, the output voltage is controlled by decreasing the operating voltage of the switches and controlling whether the inverter is to be operated or stopped.

However, in the inverter as described in U.S. Pat. No. 5,600,547 or in U.S. Pat. No. 8,400,788, the step-down converter is controlled by performing PWM control, and therefor, it is difficult to control the on-time at a high frequency. Further, for the inverter described in Japanese Patent No. 4808814, particularly in a case of an AC input power source using a power-factor improvement circuit, an input voltage range between 85 VAC and 264 VAC is required for worldwide input. The power-factor improvement circuit is constituted by a step-up converter, and therefore, the output voltage of the power-factor improvement circuit is typically within a range between 380 V and 400 V or so. The input voltage of the resonant inverter is the output voltage of the power-factor improvement circuit, switch elements capable of withstanding a voltage two to three times the input voltage are necessary in the resonant inverter even if Class EF2 inverters are used, and switches capable of withstanding a high operating voltage of 800 V to 1200 V need to be selected. As described in U.S. Patent Application Publication No. 2012/0206946, in a case where burst control on the switches is performed in the resonant inverter, when the inverter stops, the step-down converter in the preceding stage has no load, and the input voltage of the inverter increases, which is a shortcoming.

SUMMARY OF THE INVENTION

The present invention has been made in view of the above-described issues of the related art, and there is provided a reliable resonant converter and switching power supply device in which the operating voltage of switch elements is decreased without affecting the life of the switches as much as possible and for which switch elements capable of withstanding an operating voltage of about 600 V can be selected.

In order to address the above-described issues, a resonant converter according to the present invention includes a step-down converter and a resonant inverter. The step-down converter includes at least two switch elements, and a first coil connected to the at least two switch elements. The resonant inverter includes a first switch element and a second switch element that are alternately turned on and off, a first capacitor and a second capacitor connected in parallel to the first switch element and the second switch element respectively, a first inverter section constituted by the first switch element and the first capacitor, and a second inverter section constituted by the second switch element and the second capacitor. The first inverter section includes a first resonant circuit constituted by the first coil and the first capacitor, and the second inverter section includes a second resonant circuit constituted by the first coil and the second capacitor. As a consequence, the operating voltage of the switch elements can be decreased.

In the resonant converter described above, the first inverter section may further include a third resonant circuit, and the second inverter section may further include a fourth resonant circuit. As a consequence, the input voltage of the resonant inverter can be decreased, and the operating voltage of the switch elements can be decreased accordingly.

In the resonant converter described above, the third resonant circuit of the first inverter section may be constituted by a series connection of a second coil and a third capacitor placed between one end and the other end of the first switch element, and the fourth resonant circuit of the second inverter section may be constituted by a series connection of a fourth coil and a fourth capacitor placed between one end and the other end of the second switch element. As a consequence, the operating voltage of the switch elements can be decreased.

The resonant converter described above may further include a fifth resonant circuit constituted by a series connection of a fifth coil and a fifth capacitor placed between one end of the first switch element and one end of the second switch element. As a consequence, the operating voltage of the switch elements can be decreased, and a low-cost resonant converter having a smaller number of components can be implemented.

The resonant converter described above may further include a transformer connected to the at least two switch elements included in the step-down converter, and the first coil may be formed of a leakage inductance of the transformer. As a consequence, the operating voltage of the switch elements can be decreased, and a low-cost resonant converter having a smaller number of components can be implemented.

In the resonant converter described above, the at least two switch elements included in the step-down converter may be driven in accordance with a fixed duty cycle, and the first switch element and the second switch element included in the resonant inverter may be driven in accordance with a fixed duty cycle. As a consequence, the on-time of the switches is fixed, and therefore, a switching power source that is easily controlled can be implemented.

In the resonant converter described above, when a drive frequency for driving the first switch element or the second switch element is denoted by Fs, a drive frequency for driving the at least two switch elements included in the step-down converter may be 2Fs. As a consequence, a resonant converter in which the withstand voltage of the switch elements is decreased and setting of the frequency is simplified can be implemented.

A switching power supply device according to the present invention; a resonant rectifier connected to the resonant converter; a voltage detection circuit that detects an output voltage of the resonant rectifier; a hysteresis comparator that outputs a control signal for driving the at least two switch elements included in the step-down converter when a detected value of the output voltage reaches a first threshold, and outputs a control signal for stopping the at least two switch elements included in the step-down converter when the detected value reaches a second threshold; and a drive circuit that controls the at least two switch elements included in the step-down converter in accordance with the control signal. As a consequence, the operating voltage of the switch elements can be decreased.

According to the present invention, a reliable resonant converter and switching power supply device in which the life of the switch elements are not affected as much as possible can be provided.

DESCRIPTION OF THE PREFERRED EMBODIMENTS

Figure 1:
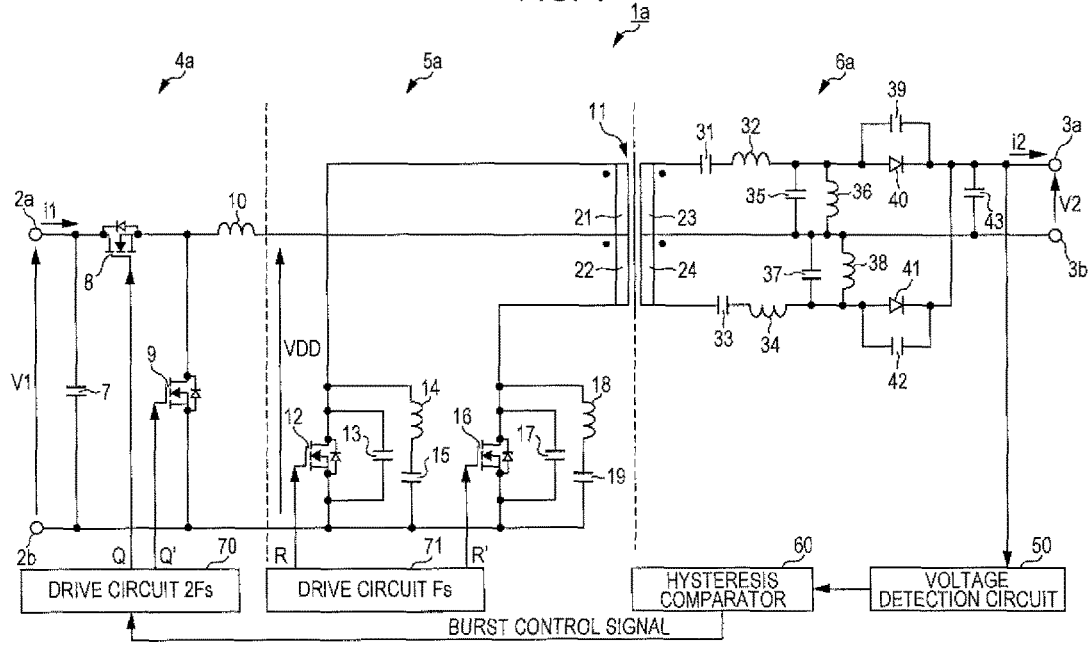
FIG. 1 is a circuit diagram illustrating a switching power supply device according to an embodiment of the present invention.

Hereinafter, preferred embodiments of the present invention will be described; however, embodiments of the present invention are not limited to those described below. Constituent elements described below include those that can be easily conceived by a person skilled in the art or that are substantially the same, and the constituent elements can be combined as appropriate.

Embodiments of the present invention are described in detail with reference to the drawings. In descriptions of the drawings, the same constituent elements are assigned the same reference numerals, and a duplicated description is omitted.

First Embodiment

FIG. 1 is a circuit diagram illustrating a configuration of a switching power supply device 1a according to an embodiment of the present invention. The resonant converter 1a illustrated in FIG. 1, which is one exemplary embodiment of a switching power supply device, includes a pair of input terminals, namely, a first input terminal 2a and a second input terminal 2b (hereinafter also collectively referred to as input terminals 2 unless specifically referred to otherwise), a pair of output terminals, namely, a first output terminal 3a and a second output terminal 3b (hereinafter also collectively referred to as output terminals 3 unless specifically referred to otherwise), a step-down converter 4a, a resonant inverter 5a, and a resonant rectifier 6a. The switching power supply device 1a converts an input voltage (DC voltage) V1 input to the input terminals 2 into an output voltage (DC voltage) V2 and outputs the output voltage V2 from the output terminals 3. In the switching power supply device 1a, the input voltage V1 and an input current i1 are input to the input terminals 2, and the output voltage V2 and a load current i2 are output from the output terminals 3. The step-down converter 4a and the resonant inverter 5a constitute the resonant converter.

The step-down converter 4a includes an input capacitor 7, a switch element 8, a switch element 9, and a first resonant coil 10. In this exemplary embodiment, the switch element 8 and the switch element 9 are formed by using metal-oxide-semiconductor field-effect-transistors (MOSFETs); however, the switch element 8 and the switch element 9 are not limited to these. The switch element 8 is formed by using an N-channel switch element; however, the switch element 8 may be formed by using a P-channel switch element. The drain terminal of the switch element 8 is connected to the first input terminal 2a and to one end of the input capacitor 7, and the source terminal of the switch element 8 is connected to one end of the first resonant coil 10 and to the drain terminal of the switch element 9. The source terminal of the switch element 9 is connected to the other end of the input capacitor 7 and to the second input terminal 2b. The other end of the first resonant coil 10 is connected to the midpoint (center tap) of a primary-side winding of a transformer 11 in the resonant inverter 5a. The switch element 8 and the switch element 9 each have a parasitic diode between the source and the drain, and the diode has an anode in the direction towards the second input terminal 2b and a cathode in the direction towards the first input terminal 2a. The resonant inverter 5a includes the transformer 11 having the primary side winding including a first winding 21 and a second winding 22, and two inverter sections. The transformer 11 is interposed between the drain of a first switch element 12 and the drain of a second switch element 16, and the midpoint between the first winding 21 and the second winding 22 of the transformer 11 is connected to the other end of the first resonant coil 10. The first inverter section includes the first switch element 12, a first resonant capacitor 13, a second choke coil 14, and a third resonant capacitor 15. The second inverter section includes the second switch element 16, a second resonant capacitor 17, a fourth choke coil 18, and a fourth resonant capacitor 19. The drain terminal of the switch element 12 is connected to one end of the first resonant capacitor 13 and to one end of the second choke coil 14. The other end of the second choke coil 14 is connected to one end of the third resonant capacitor 15. The other end of the third resonant capacitor 15 is connected to the other end of the first resonant capacitor 13, to the source terminal of the switch element 12, and to the second input terminal 2b. The drain terminal of the switch element 16 is connected to one end of the second resonant capacitor 17 and to one end of the fourth choke coil 18. The other end of the fourth choke coil 18 is connected to one end of the fourth resonant capacitor 19. The other end of the fourth resonant capacitor 19 is connected to the other end of the second resonant capacitor 17, to the source terminal of the switch element 16, and to the second input terminal 2b.

In the resonant inverter 5a, each inverter section includes two resonant circuits. A first resonant circuit included in the first inverter section is constituted by the first resonant coil 10 and the first resonant capacitor 13. Electric current routes that pass through the first resonant circuit includes a route that passes through the first resonant coil 10, the first winding 21 of the transformer 11, the first resonant capacitor 13, and the switch element 9 and a route that passes through the input capacitor 7, the switch element 8, the first resonant coil 10, the first winding 21 of the transformer 11, and the first resonant capacitor 13. A third resonant circuit is constituted by the second choke coil 14 and the third resonant capacitor 15. Electric current routes that pass through the third resonant circuit includes a route that passes through the first resonant coil 10, the first winding 21 of the transformer 11, the second choke coil 14, the third resonant capacitor 15, and the switch element 9 and a route that passes through the input capacitor 7, the switch element 8, the first resonant coil 10, the first winding 21 of the transformer 11, the second choke coil 14, and the third resonant capacitor 15. A similar resonant configuration is formed in the second inverter section. A second resonant circuit included in the second inverter section is constituted by the first resonant coil 10 and the second resonant capacitor 17. Electric current routes that pass through the second resonant circuit includes a route that passes through the first resonant coil 10, the second winding 22 of the transformer 11, the second resonant capacitor 17, and the switch element 9 and a route that passes through the input capacitor 7, the switch element 8, the first resonant coil 10, the second winding 22 of the transformer 11, and the second resonant capacitor 17. A fourth resonant circuit included in the second inverter section is constituted by the fourth choke coil 18 and the fourth resonant capacitor 19. Electric current routes that pass through the fourth resonant circuit includes a route that passes through the first resonant coil 10, the second winding 22 of the transformer 11, the fourth choke coil 18, the fourth resonant capacitor 19, and the switch element 9 and a route that passes through the input capacitor 7, the switch element 8, the first resonant coil 10, the second winding 22 of the transformer 11, the fourth choke coil 18, and the fourth resonant capacitor 19. The first resonant coil 10 is shared by the first resonant circuit and the second resonant circuit. In the first embodiment, the switching power supply device 1a is configured on the basis of a circuit system for resonant step-down converters, for example. Accordingly, the input voltage V1 input to the input terminals 2 is decreased by the step-down converter 4a, the decreased voltage is converted into an AC voltage by the resonant inverter 5a, and the AC voltage is transmitted to the resonant rectifier 6a. To each of the switch elements 8, 9, 12, and 16, a reverse-conduction diode is provided so that an electric current flows in the direction from the input terminal 2b to the input terminal 2a. Further, to each of the switch elements 12 and 16, a drain-source inter-terminal capacitance is provided. In this embodiment, it is assumed that the inter-terminal capacitance provided to the switch element 12 and that provided to the switch element 16 are respectively included in the resonant capacitors 13 and 17. To the switch elements 8 and 9, a drive circuit 70 having a frequency twice the drive frequency Fs of the resonant inverter 5a is connected, and the switch elements 8 and 9 are alternately turned on and off in accordance with a fixed duty cycle on the basis of drive signals from the drive circuit 70. To the switch elements 12 and 16, a drive circuit 71 having a frequency equal to the drive frequency Fs is connected, and the drive circuit 71 alternately turns the switch elements 12 and 16 on and off in accordance with a fixed duty cycle. The on-duty dinv of the switch elements 12 and 16 of the resonant inverter 5a is usually 50%; however, the on-duty dinv is set to a value smaller than 50% in a case where the resonance time upon switch off is long.

The resonant rectifier 6a includes rectifier diodes 40 and 41, capacitors 39 and 42 provided in parallel to the rectifier diodes 40 and 41 respectively, an output capacitor 43, resonant choke coils 32 and 34, resonant capacitors 31 and 33, resonant choke coils 36 and 38, and resonant capacitors 35 and 37. The resonant rectifier 6a receives the AC voltage generated by the resonant inverter 5a, rectifies, smoothes, and converts the AC voltage into an output voltage V2, and outputs the output voltage V2 from the output terminals 3.

The output voltage V2 is detected by a voltage detection circuit 50 and is compared with a reference voltage by a hysteresis comparator 60. A burst control signal generated by the hysteresis comparator 60 is transmitted to the drive circuit 70 of the step-down converter 4a. In a case where the hysteresis comparator 60 transmits an off-signal, both drive signals Q and Q' respectively connected to the gates of the switch elements 8 and 9 are turned off. In a case where the hysteresis comparator 60 transmits an on-signal, the drive signals Q and Q' are alternately turned on and off. At this time, drive signals R and R' of the drive circuit 71 respectively connected to the gates of the switch elements 12 and 13 of the resonant inverter 5a are not controlled.

Figure 2:
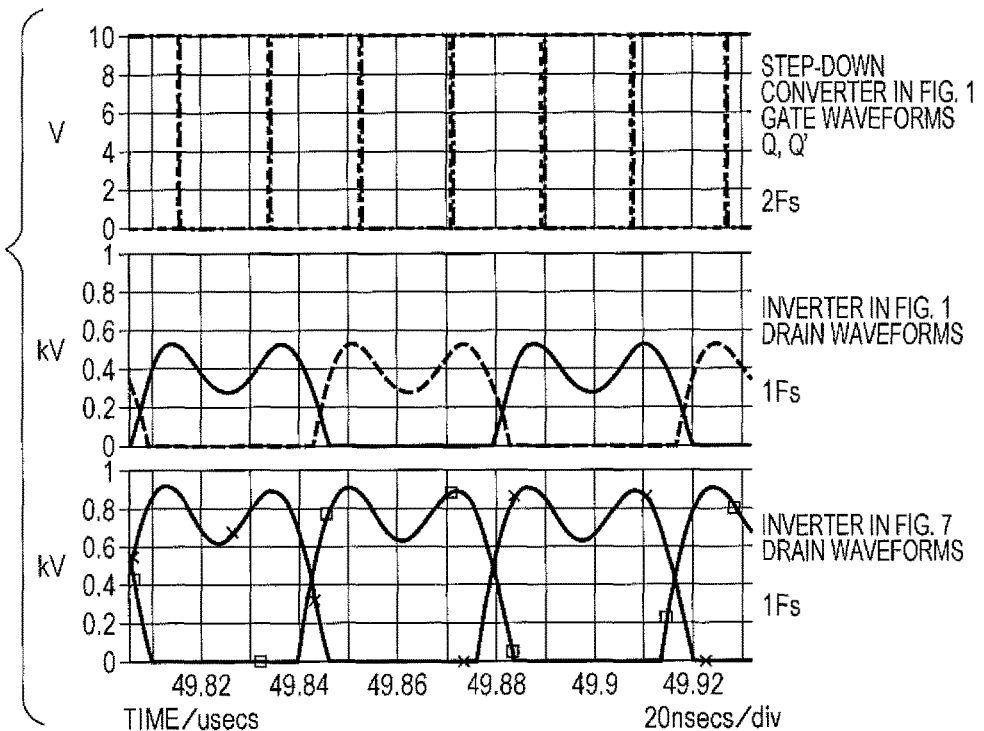
FIG. 2 includes diagrams for comparing gate waveforms relating to a step-down converter illustrated in FIG. 1, drain waveforms relating to a resonant inverter illustrated in FIG. 1, and drain waveforms relating to a resonant inverter illustrated in FIG. 9.

FIG. 2 illustrates waveforms representing example operations in FIG. 1. The on-duty d of the drive signal Q for driving the switch element 8 of the step-down converter 4a and of the drive signal Q' for driving the switch element 9 of the step-down converter 4a is approximately 50%. A very short dead time is provided between the drive signals Q and Q' so that the drive signals Q and Q' are not simultaneously turned on. In a case where the input voltage V1 is 400 V, an input voltage VDD of the resonant inverter 5a is represented by VDD=V1*d and is approximately 200 V. When the burst cycle is represented by T, and the burst-on period is represented by t, the burst-on-duty dbur is represented by dbur=t/T. The burst-on-duty dbur of the step-down converter 4a is determined on the basis of the ratio between the input voltage V1 of the step-down converter 4a and the input voltage VDD of the resonant inverter 5a, which is represented by VDD=V1*d*dbur. In a case where the burst-on-duty is 80%, the input voltage VDD of the resonant inverter 5a is represented by 400*0.5*0.8=160 V. Each inverter section in the resonant inverter 5a illustrated in FIG. 1 includes two resonators. To the switch elements 12 and 16, gate signals having phases that differ by 180 degrees and having the on-duty dinv of approximately 30% are respectively applied. The on-duty dinv needs to be adjusted so that the resonance voltage when both the switch elements 12 and 16 are turned off is 0 V. The drain impedances when both the switch elements 12 and 16 are turned off respectively have impedance properties determined by the above-described two resonators and result in the drain voltages as illustrated by the middle diagram in FIG. 2. This example illustrates a case where the input voltage V1 is 400 V, the on-duty d of the switch elements 8 and 9 of the step-down converter 4a is 50%, the output voltage is not controlled, and the burst-on-duty dbur is 100%. In this case, the input voltage VDD of the resonant inverter 5a is 200 V, and the operating voltage of the first switch element 12 and the second switch element 16 is approximately 500 V. In a case where the resonant inverter 5a is configured without using the step-down converter 4a, the input voltage VDD of the resonant inverter 5a is 400 V, which is equal to the voltage applied to the input terminal 2a. In this case, the operating voltage of the first switch element 12 and the second switch element 16 is equal to the drain voltage of 900 V or more as illustrated in the lower diagram in FIG. 2. In order to further decrease the operating voltage of the switch elements 12 and 16, the on-duty ratio d of the step-down converter 4a may be decreased.

Figure 3:
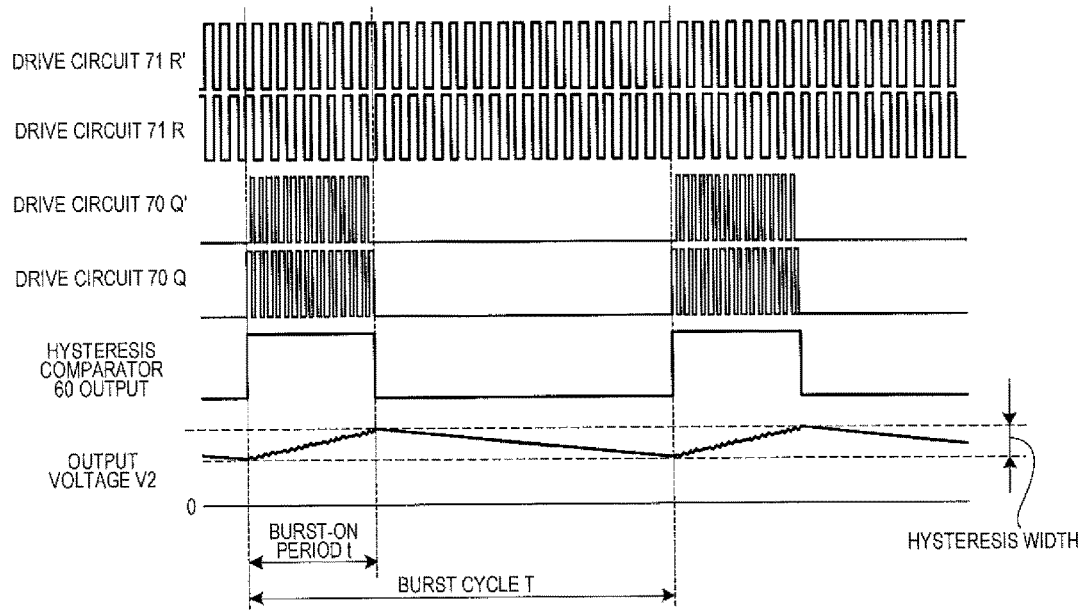
FIG. 3 is a diagram schematically illustrating operating waveforms illustrated in FIG. 1.

FIG. 3 is a diagram schematically illustrating operating waveforms relating to the switching power supply device 1a illustrated in FIG. 1. The horizontal axis indicates time, and the vertical axis indicates, from the top, the signal R' of the drive circuit 71 applied to the gate of the switch element 16, the signal R of the drive circuit 71 applied to the gate of the switch element 12, the signal Q' of the drive circuit 70 applied to the gate of the switch element 9, the signal Q of the drive circuit 70 applied to the gate of the switch element 8, the output signal of the hysteresis comparator 60, and the output voltage V2.

The drive signals R' and R respectively applied to the switch elements 16 and 12 are drive signals having the same frequencies, a phase shift of 180 degrees therebetween, and a fixed duty width. The drive signals Q' and Q respectively applied to the switch elements 9 and 8 have the same frequencies and a phase shift of 180 degrees therebetween. The output voltage V2 is detected by the voltage detection circuit 50, the detected voltage is compared with a first threshold of the hysteresis comparator 60, and the output of the hysteresis comparator 60 is inverted when the detected voltage exceeds the first threshold. When the output of the hysteresis comparator 60 is inverted, the reference voltage is decreased by an amount equal to a hysteresis for the output voltage that is set as desired, and the resulting voltage is set as a second threshold to thereby prevent chattering. As a result, the drive circuit 70 is stopped in accordance with the output of the hysteresis comparator 60, and both the signals Q and Q' of the drive circuit 70 are turned off accordingly, which results in a burst-off period. Thereafter, the output voltage V2 decreases, the detected voltage detected by the voltage detection circuit 50 is compared with the second threshold of the hysteresis comparator 60, and the output of the hysteresis comparator 60 is restored to a non-inverting state when the detected voltage falls below the second threshold. When the hysteresis comparator 60 is restored to the non-inverting state, the reference voltage is also restored to the original state by the amount equal to the set hysteresis width, and the resulting voltage is set as the first threshold to thereby prevent chattering. Accordingly, the drive circuit 70 is operated in accordance with the output of the hysteresis comparator 60, resulting in a burst-on period in which the signals Q and Q' of the drive circuit 70 are alternately turned on. A period from this burst-on period to burst-off period is assumed to be a burst-on period t, and a period obtained by adding the resonant coil choke coil 14 burst-on period and the burst-off period for one cycle is assumed to be the burst cycle T.

The burst cycle T for controlling the output voltage V2 is longer than a drive cycle ½Fs for driving the step-down converter 4a. The burst frequency needs to be set to a frequency higher than the human audible frequency. In a case where the drive frequency is 13.56 MHz, for example, the cycle for one pulse is equal to 73.746 nsec. In a case where the burst frequency is 20 kHz, the burst cycle T is equal to 20 usec. Accordingly, in one burst cycle of 20 kHz, 678 pulses each having a drive frequency of 13.56 MHz are included. If the drive frequency remains unchanged and the number of intermittent pulses increases, the burst frequency decreases, and an audible sound may be produced. The hysteresis width of the hysteresis comparator 60 is set so that the number of intermittent pulses does not increase. In general, the burst cycle T becomes shorter as the hysteresis width decreases, and the burst cycle T becomes longer as the hysteresis width increases. Although the burst frequency T can be increased when the hysteresis width is smaller, a noise immunity issue is to be considered. In a high-frequency converter, the on-time is short, and therefore, it is difficult to make the drive circuit 70 control the pulse width using PWM. Therefore, the drive circuit 70 is turned on and off in accordance with a fixed on-time or a fixed off-time. The output voltage V2 is adjusted in such a manner that the drive circuit 70 that is being turned on and off at a high frequency is turned on and off at a low frequency in accordance with the burst frequency T that is set to a low frequency. Note that the drive frequency 2Fs of the drive circuit 70 need not synchronize with the drive frequency Fs of the drive circuit 71.

As described above, by driving the step-down converter 4a in accordance with burst control, it is possible to control the output voltage V2. At this time, the input voltage VDD of the resonant inverter 5a can be set to a low voltage, and therefore, low-voltage switch elements can be used. Low-voltage switch elements have a low on-resistance and a high switching speed, and therefore, an efficient resonant inverter can be designed.

Second Embodiment

Figure 4:
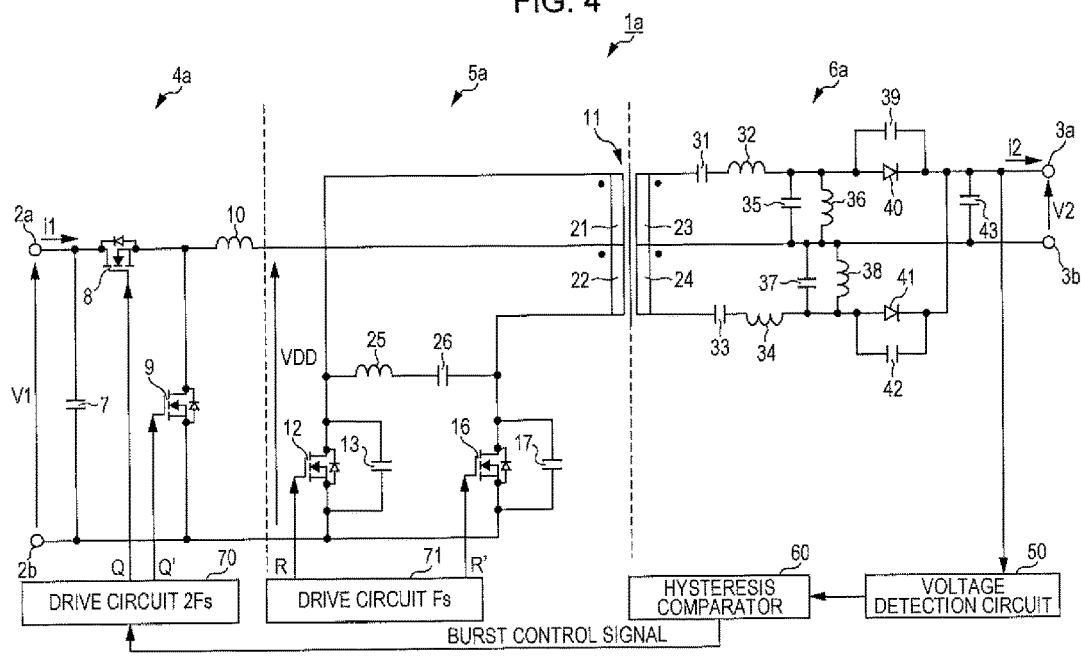
FIG. 4 is a circuit diagram illustrating the switching power supply device according to an embodiment of the present invention in which a second resonator illustrated in FIG. 1 is shared by inverter sections.

FIG. 4 is a circuit diagram illustrating a configuration of the switching power supply device 1a according to a second embodiment of the present invention. The second embodiment is different from the first embodiment in that the third and fourth resonant circuits that constitute the resonant inverter 5a are replaced by a fifth resonant circuit that is shared by the inverter sections. Specifically, the second choke coil 14, the third resonant capacitor 15, the fourth choke coil 18, and the fourth resonant capacitor 19 illustrated in FIG. 1 are replace by a series connection of a fifth resonant coil 25 and a fifth resonant capacitor 26 placed between the drain terminal of the switch element 12 and the drain terminal of the switch element 16. The fifth resonant coil 25 and the fifth resonant capacitor 26 constitute the fifth resonant circuit. The rest of the configuration is the same as in the first embodiment. By driving the step-down converter 4a in accordance with burst control, it is possible to control the output voltage V2. Further, the input voltage VDD of the resonant inverter 5a can be set to a low voltage, and therefore, low-voltage switch elements can be used as the switch elements 12 and 16. The switch elements 12 and 16, which are low-voltage switch elements, have a low on-resistance and a high switching speed, and therefore, an efficient resonant inverter can be provided. The second resonator is shared by the two inverter sections, and therefore, adjustment of the resonance point needs to be performed only for one location, namely, for the fifth resonant circuit. Accordingly, a low-cost resonant inverter with easy adjustment can be provided.

Third Embodiment

Figure 5:
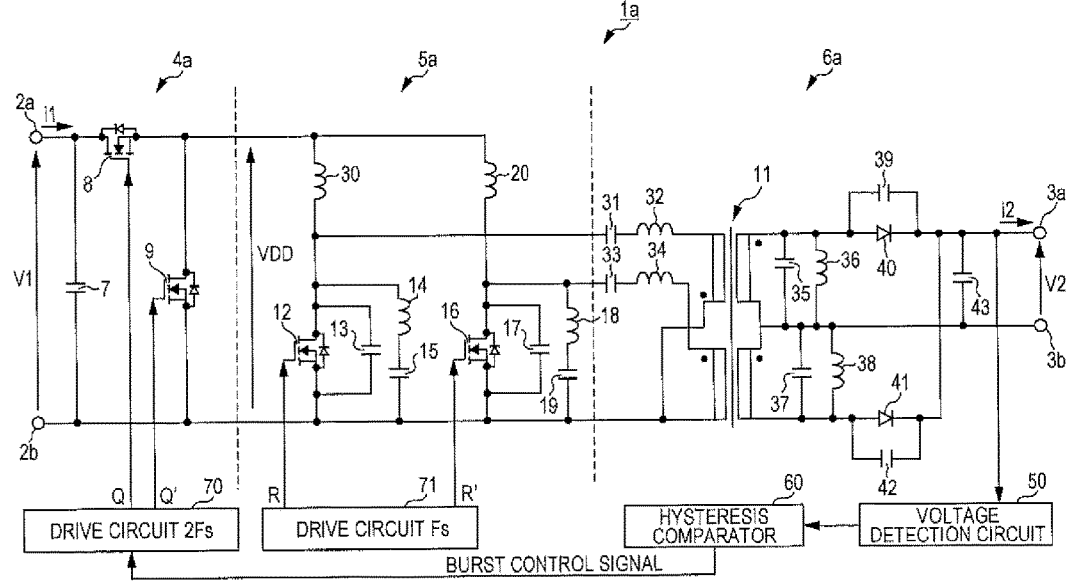
FIG. 5 is a circuit diagram illustrating the switching power supply device according to an embodiment of the present invention in which a transformer illustrated in FIG. 1 is placed on a resonant rectifier side, and a first resonant coil is placed between a switch of each inverter section and an input power source.

FIG. 5 is a circuit diagram illustrating a configuration of the switching power supply device 1a according to a third embodiment of the present invention. The third embodiment is different from the first embodiment in that the transformer 11 is not placed between the resonant inverter 5a and the resonant rectifier 6a but is placed in the resonant rectifier 6a. Further, two resonant coils, that replace the first resonant coil 10 are provided. The circuit configuration is described below.

The step-down converter 4a includes the input capacitor 7, the switch element 8, and the switch element 9. The drain terminal of the switch element 8 is connected to the first input terminal 2a and to the input capacitor 7, and the source terminal of the switch element 8 is connected to one end of the sixth resonant coil 30, to one end of the seventh resonant coil 20, and to the drain terminal of the switch element 9. The source terminal of the switch element 9 is connected to the input capacitor 7 and to the second input terminal 2b. The switch element 8 and the switch element 9 each have a parasitic diode between the source and the drain, and the diode has an anode in the direction towards the second input terminal 2b and a cathode in the direction towards the first input terminal 2a. The resonant inverter 5a includes two inverter sections. The first inverter section includes the sixth resonant coil 30, the switch element 12, the first resonant capacitor 13, the second choke coil 14, and the third resonant capacitor 15. The second inverter section includes the seventh resonant coil 20, the switch element 16, the second resonant capacitor 17, the fourth choke coil 18, and the fourth resonant capacitor 19. The drain terminal of the switch element 12 is connected to the other end of the sixth resonant coil 30, to one end of the first resonant capacitor 13, to one end of the second choke coil 14, and to one end of the resonant capacitor 31 in the resonant rectifier 6a. The other end of the second choke coil 14 is connected to one end of the third resonant capacitor 15. The other end of the third resonant capacitor 15 is connected to the other end of the first resonant capacitor 13, to the source terminal of the switch element 12, and to the second input terminal 2b. The drain terminal of the switch element 16 is connected to the other end of the seventh resonant coil 20, to one end of the second resonant capacitor 17, to one end of the fourth choke coil 18, and to one end of the resonant capacitor 33 in the resonant rectifier 6a. The other end of the fourth choke coil 18 is connected to one end of the fourth resonant capacitor 19. The other end of the fourth resonant capacitor 19 is connected to the other end of the second resonant capacitor 17, to the source terminal of the switch element 16, and to the second input terminal 2b.

In the resonant inverter 5a, each inverter section includes two resonant circuits. A first resonant circuit included in the first inverter section is constituted by the sixth resonant coil 30 and the first resonant capacitor 13. Electric current routes that pass through the first resonant circuit includes a route that passes through the sixth resonant coil 30, the first resonant capacitor 13, and the switch element 9 and a route that passes through the input capacitor 7, the switch element 8, the sixth resonant coil 30, and the first resonant capacitor 13. A third resonant circuit is constituted by the second choke coil 14 and the third resonant capacitor 15. Electric current routes that pass through the third resonant circuit includes a route that passes through the sixth resonant coil 30, the second choke coil 14, the third resonant capacitor 15, and the switch element 9 and a route that passes through the input capacitor 7, the switch element 8, the sixth resonant coil 30, the second choke coil 14, and the third resonant capacitor 15. A similar resonant configuration is formed in the second inverter section. A second resonant circuit included in the second inverter section is constituted by the seventh resonant coil 20 and the second resonant capacitor 17. Electric current routes that pass through the second resonant circuit includes a route that passes through the seventh resonant coil 20, the second resonant capacitor 17, and the switch element 9 and a route that passes through the input capacitor 7, the switch element 8, the seventh resonant coil 20, and the second resonant capacitor 17. A fourth resonant circuit included in the second inverter section is constituted by the fourth choke coil 18 and the fourth resonant capacitor 19. Electric current routes that pass through the fourth resonant circuit includes a route that passes through the seventh resonant coil 20, the fourth choke coil 18, the fourth resonant capacitor 19, and the switch element 9 and a route that passes through the input capacitor 7, the switch element 8, the seventh resonant coil 20, the fourth choke coil 18, and the fourth resonant capacitor 19. In the third embodiment, the switching power supply device 1a is configured on the basis of a circuit system for resonant step-down converters, for example. Accordingly, the input voltage V1 input to the input terminals 2 is decreased by the step-down converter 4a, the decreased voltage is converted into an AC voltage by the resonant inverter 5a, and the AC voltage is transmitted to the resonant rectifier 6a. To each of the switch elements 8, 9, 12, and 16, a reverse-conduction diode is provided so that an electric current flows in the direction from the input terminal 2b to the input terminal 2a. Further, to each of the switch elements 12 and 13, a drain-source inter-terminal capacitance is provided. In the third embodiment, it is assumed that the inter-terminal capacitance provided to the switch element 12 and that provided to the switch element 16 are respectively included in the resonant capacitors 13 and 17. To the switch elements 8 and 9, the drive circuit 70 having a frequency twice the drive frequency Fs of the resonant inverter 5a is connected, and the switch elements 8 and 9 are alternately turned on and off in accordance with a fixed duty cycle on the basis of drive signals from the drive circuit 70. To the switch elements 12 and 16, the drive circuit 71 having a frequency equal to the drive frequency Fs is connected, and the drive circuit 71 alternately turns the switch elements 12 and 16 on and off in accordance with a fixed duty cycle. The on-duty dinv of the resonant inverter is usually 50%; however, the on-duty dinv is set to a value smaller than 50% in a case where the resonance time upon switch off is long.

The resonant rectifier 6a is connected to the first inverter section and the second inverter section of the resonant inverter 5a. The drain terminal of the switch 12 in the first inverter section is connected to one end of the resonant capacitor 31. The other end of the resonant capacitor 31 is connected to one end of the resonant coil 32. The other end of the resonant coil 32 is connected to one end of the first winding on the primary side of the transformer 11. The other end of the first winding on the primary side of the transformer 11 is connected to the source terminal of the switch element 12. The drain terminal of the switch element 16 is connected to one end of the resonant capacitor 33. The other end of the resonant capacitor 33 is connected to one end of the resonant coil 34. The other end of the resonant coil 34 is connected to one end of the second winding on the primary side of the transformer 11. The other end of the second winding on the primary side is connected to the source terminal of the switch element 16. The transformer 11 is placed within the resonant rectifier 6a and isolates the primary side from a secondary side. As described above, the transformer 11 includes two winding, namely, the first finding and the second winding on the primary side, and further includes two winding, namely, a third winding and a fourth winding, on the secondary side. One end of the third winding on the secondary side of the transformer 11 is connected to one end of the resonant capacitor 33, to one end of the resonant coil 36, to the anode of the rectifier diode 40, and to one end of the resonant capacitor 39. The other end of the resonant capacitor 35, the other end of the resonant coil 36, the other end of the third winding on the secondary side of the transformer 11, and the second output terminal 3b are connected to one another. The cathode of the rectifier diode 40 is connected to the other end of the resonant capacitor 39, to one end of the output capacitor 43, and to the output terminal 3a. Accordingly, the rectifier diode 40 is connected in parallel to the resonant capacitor 39. The other end of the output capacitor 43 is connected to the second output terminal 3b and to the other end of the third winding on the secondary side.

One end of the fourth winding on the secondary side of the transformer 11 is connected to the other end of the third winding on the secondary side, to one end of the resonant capacitor 37, to one end of the resonant coil 38, to the other end of the output capacitor 43, and to the second output terminal 3b. The other end of the fourth winding on the secondary side is connected to the other end of the resonant capacitor 37, to the other end of the resonant coil 38, to the anode of the rectifier diode 41, and to one end of the resonant capacitor 42. The cathode of the rectifier diode 41 is connected to the other end of the resonant capacitor 42. One end of the output capacitor 43 is connected to the first output terminal 3a. Accordingly, the rectifier diode 41 is connected in parallel to the resonant capacitor 42. The resonant rectifier 6a receives the AC voltage generated by the resonant inverter 5a, rectifies, smoothes, and converts the AC voltage into the output voltage V2, and outputs the output voltage V2 from the output terminals 3a and 3b. The output voltage V2 is detected by the voltage detection circuit 50 and is compared with the reference voltage by the hysteresis comparator 60. A burst control signal generated by the hysteresis comparator 60 is transmitted to the drive circuit 70 of the step-down converter 4a. In the case where the hysteresis comparator 60 transmits an off-signal, both the drive signals Q and Q' respectively connected to the gates of the switch elements 8 and 9 are turned off. In the case where the hysteresis comparator 60 transmits an on-signal, the drive signals Q and Q' are alternately turned on and off. At this time, the drive signals R and R' respectively connected to the gates of the switch elements 12 and 16 of the resonant inverter 5a are not controlled.

As described above, by driving the step-down converter 4a in accordance with burst control, it is possible to control the output voltage V2. At this time, the input voltage VDD of the resonant inverter 5a can be set to a low voltage, and therefore, low-voltage switch elements can be used. Low-voltage switch elements have a low on-resistance and a high switching speed, and therefore, an efficient resonant inverter and switching power supply device can be provided.

Fourth Embodiment

Figure 6:
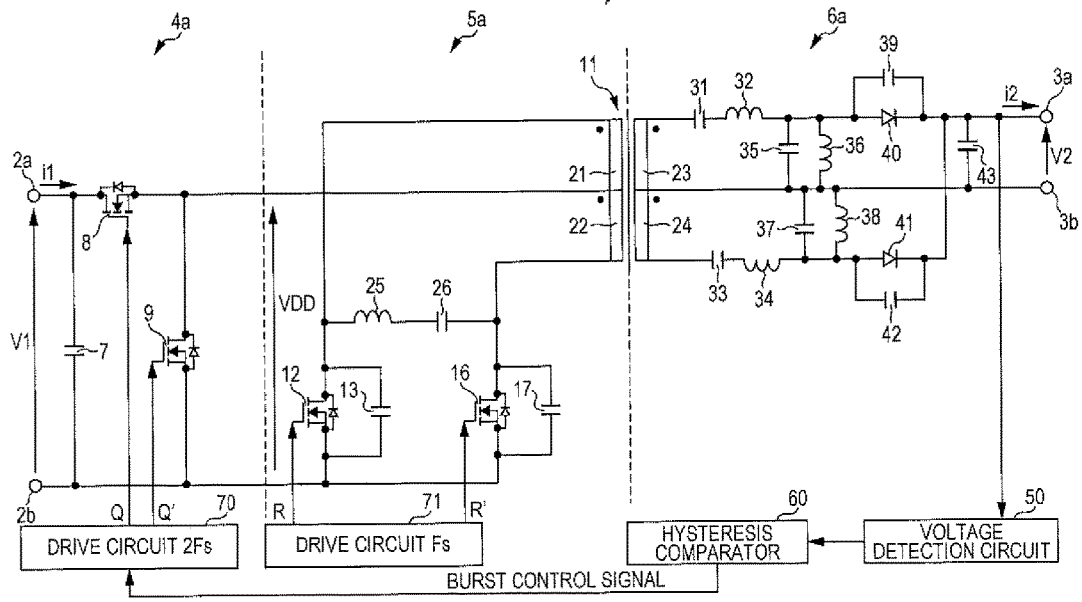
FIG. 6 is a circuit diagram illustrating the switching power supply device according to an embodiment of the present invention in which a first coil illustrated in FIG. 5 is formed of the leakage inductance of the transformer.

FIG. 6 is a circuit diagram illustrating a configuration of the switching power supply device 1a according to a fourth embodiment of the present invention. The fourth embodiment is different from the second embodiment in that the first resonant coil 10 is removed, the leakage inductor of the first winding 21 and the second winding 22 of the transformer 11 is used as the first resonant coil, and the circuit is configured. The rest of the configuration is the same as in the second embodiment illustrated in FIG. 4. Consequently, the operating voltage of the switch elements can be decreased, and a low-cost resonant converter having a smaller number of components can be implemented.

Fifth Embodiment

Figure 7:
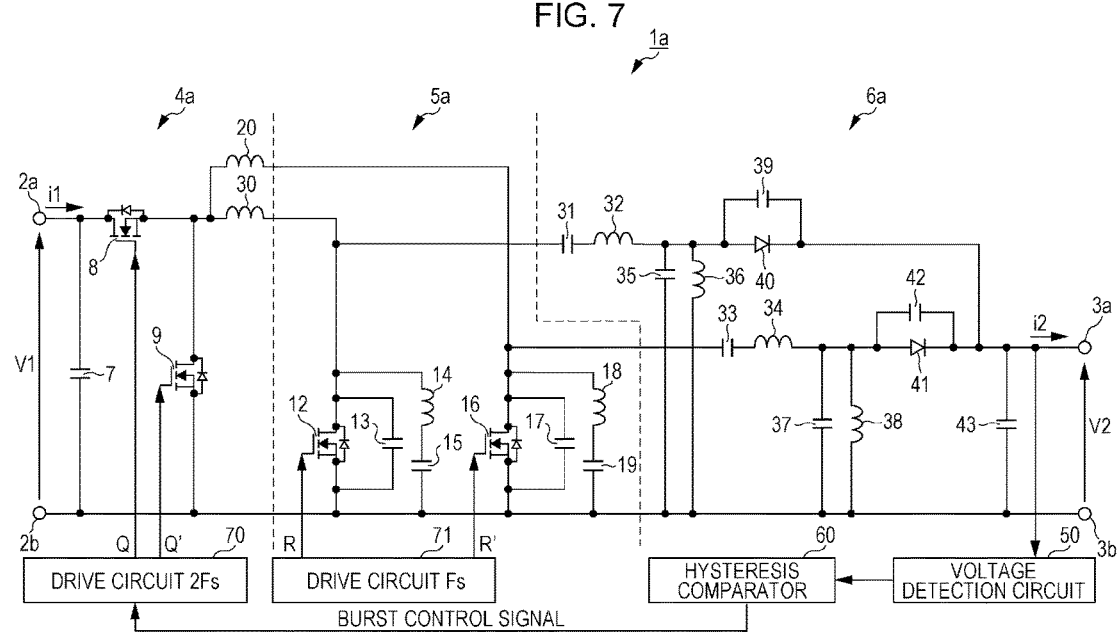
FIG. 7 is a circuit diagram illustrating the switching power supply device according to an embodiment of the present invention in which an isolated converter illustrated in FIG. 5 is replaced by a non-isolated converter.
Figure 8:
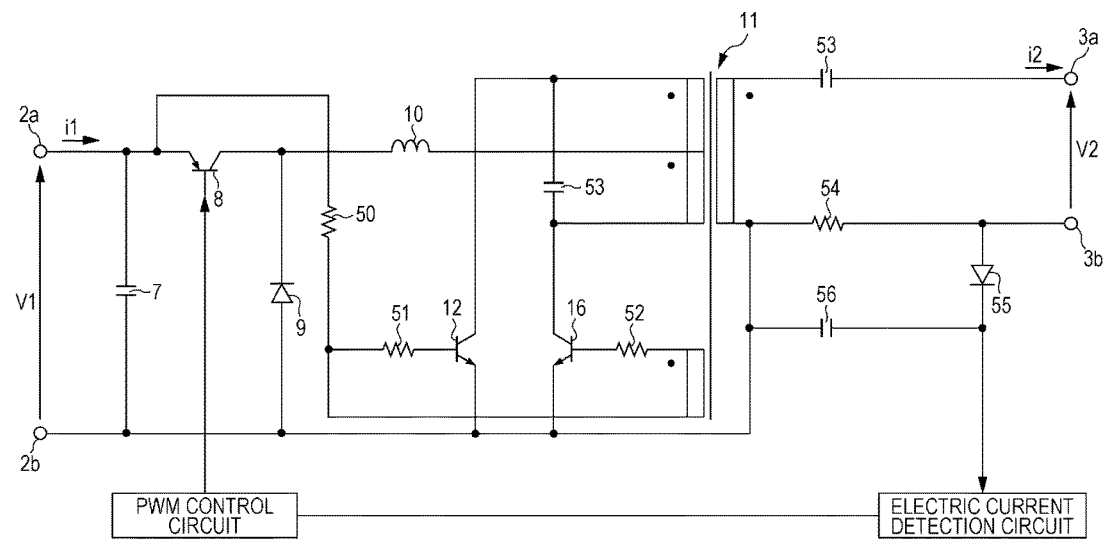
FIG. 8 is a circuit diagram illustrating a switching power supply device according to the related art.
Figure 9:
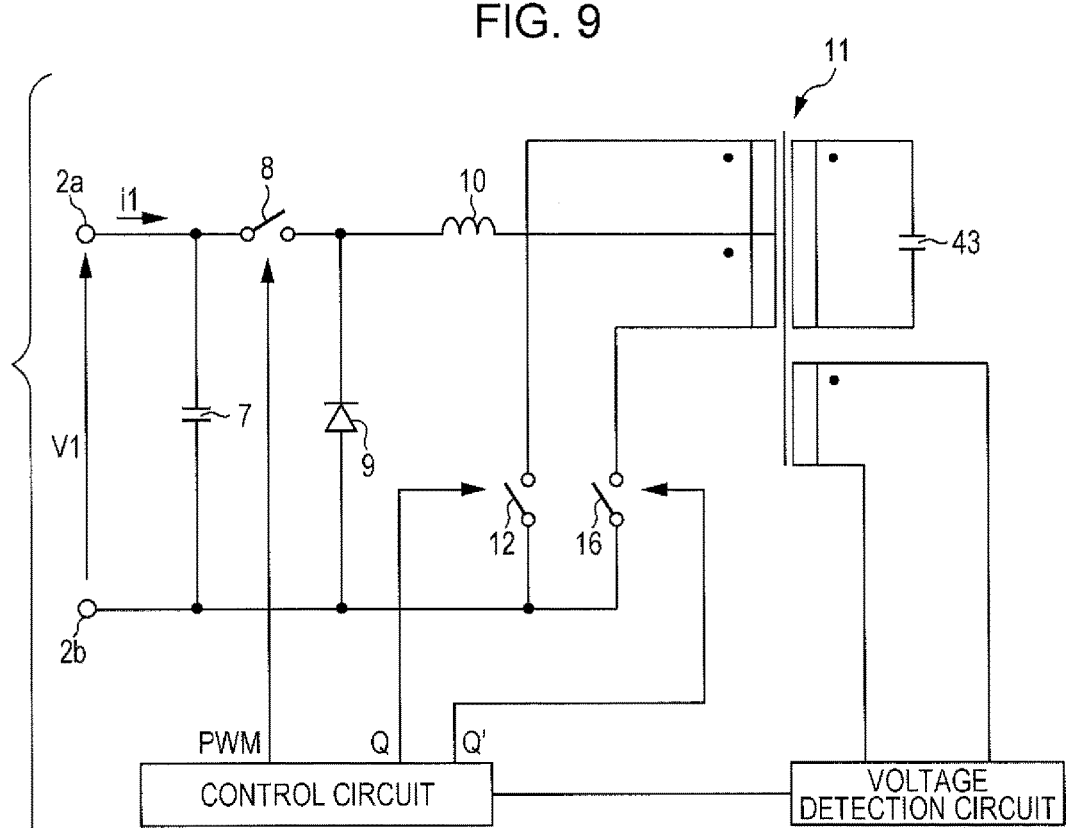
FIG. 9 is a circuit diagram illustrating a two-converter-type switching power supply device according to the related art.
Figure 9:
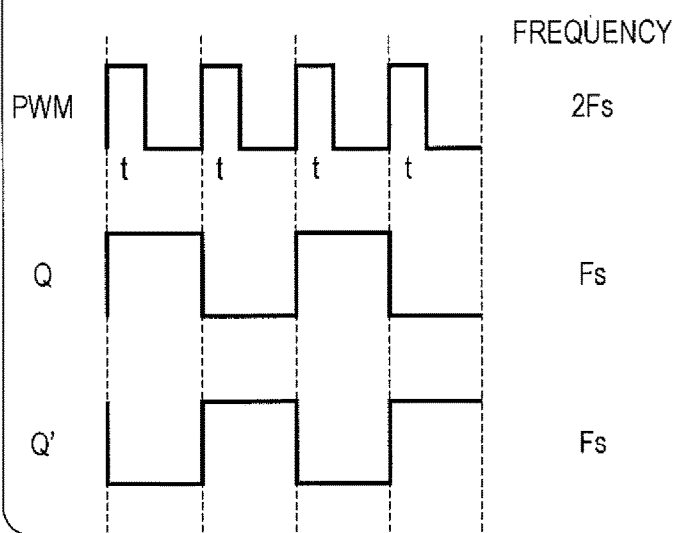

FIG. 7 is a circuit diagram illustrating a configuration of the switching power supply device 1a according to a fifth embodiment of the present invention. The fifth embodiment is different from the third embodiment in that the transformer 11 is removed, and a non-isolated circuit is configured. The rest of the configuration is the same as in the third embodiment illustrated in FIG. 5. The circuit configuration is not limited to an isolated configuration, are applicable to a switching power supply device having a non-isolated circuit configuration.

What is claimed is:

1. A resonant converter comprising:
a step-down converter including:
a first switch element;
a second switch element; and
a first coil connected to the first and second switch elements; and
a resonant inverter including:
a third switch element and a fourth switch element that are alternately turned on and off;
a first capacitor and a second capacitor connected in parallel to the third switch element and the fourth switch element, respectively;
a first inverter section constituted by the third switch element and the first capacitor, the first inverter section including a first resonant circuit constituted by the first coil and the first capacitor;
a second inverter section constituted by the fourth switch element and the second capacitor, the second inverter section including a second resonant circuit constituted by the first coil and the second capacitor; and
a fifth resonant circuit constituted by a series connection of a fifth coil and a fifth capacitor placed between one end of the third switch element and one end of the fourth switch element.

2. The resonant converter according to claim 1, wherein the first inverter section further includes a third resonant circuit, and
the second inverter section further includes a fourth resonant circuit.

3. The resonant converter according to claim 2, wherein the third resonant circuit of the first inverter section is constituted by a series connection of a second coil and a third capacitor placed between one end and the other end of the third switch element, and
the fourth resonant circuit of the second inverter section is constituted by a series connection of a fourth coil and a fourth capacitor placed between one end and the other end of the fourth switch element.

4. The resonant inverter according to claim 2, further comprising:
a transformer connected to the first and second switch elements,
wherein the first coil is formed of a leakage inductance of the transformer.

5. The resonant converter according to claim 2, wherein the first and second switch elements are driven in accordance with a fixed duty cycle, and the third switch element and the fourth switch element are driven in accordance with a fixed duty cycle.

6. The resonant converter according to claim 2, wherein when a drive frequency for driving the third switch element or the fourth switch element is denoted by Fs, a drive frequency for driving the first and second switch elements is 2Fs.

7. A switching power supply device comprising:
the resonant converter according to claim 2;
a resonant rectifier connected to the resonant converter;
a voltage detection circuit that detects an output voltage of the resonant rectifier;
a hysteresis comparator that outputs a control signal for driving the first and second switch elements when a detected value of the output voltage reaches a first threshold, and outputs a control signal for stopping the first and second switch elements when the detected value reaches a second threshold; and
a drive circuit that controls the first and second switch elements in accordance with the control signal.

8. The resonant inverter according to claim 1, further comprising:
a transformer connected to the first and second switch elements,
wherein the first coil is formed of a leakage inductance of the transformer.

9. The resonant converter according to claim 8, wherein the first and second switch elements are driven in accordance with a fixed duty cycle, and the third switch element and the fourth switch element are driven in accordance with a fixed duty cycle.

10. The resonant converter according to claim 8, wherein when a drive frequency for driving the third switch element or the fourth switch element is denoted by Fs, a drive frequency for driving the first and second switch elements is 2Fs.

11. A switching power supply device comprising:
the resonant converter according to claim 8;
a resonant rectifier connected to the resonant converter;
a voltage detection circuit that detects an output voltage of the resonant rectifier;
a hysteresis comparator that outputs a control signal for driving the first and second switch elements when a detected value of the output voltage reaches a first threshold, and outputs a control signal for stopping the first and second switch elements when the detected value reaches a second threshold; and
a drive circuit that controls the first and second switch elements in accordance with the control signal.

12. The resonant converter according to claim 1, wherein the first and second switch elements are driven in accordance with a fixed duty cycle, and the third switch element and the fourth switch element are driven in accordance with a fixed duty cycle.

13. The resonant converter according to claim 12, wherein when a drive frequency for driving the third switch element or the fourth switch element is denoted by Fs, a drive frequency for driving the first and second switch elements is 2Fs.

14. A switching power supply device comprising:
the resonant converter according to claim 12;
a resonant rectifier connected to the resonant converter;
a voltage detection circuit that detects an output voltage of the resonant rectifier;
a hysteresis comparator that outputs a control signal for driving the first and second switch elements when a detected value of the output voltage reaches a first threshold, and outputs a control signal for stopping the first and second switch elements when the detected value reaches a second threshold; and
a drive circuit that controls the first and second switch elements in accordance with the control signal.

15. A switching power supply device comprising:
the resonant converter according to claim 1;
a resonant rectifier connected to the resonant converter;
a voltage detection circuit that detects an output voltage of the resonant rectifier;
a hysteresis comparator that outputs a control signal for driving the first and second switch elements when a detected value of the output voltage reaches a first threshold, and outputs a control signal for stopping the first and second switch elements when the detected value reaches a second threshold; and
a drive circuit that controls the first and second switch elements in accordance with the control signal.

16. The resonant converter according to claim 1, wherein when a drive frequency for driving the third switch element or the fourth switch element is denoted by Fs, a drive frequency for driving the first and second switch elements is 2Fs.

17. A resonant converter comprising:
a step-down converter including:
   a first switch element;
   a second switch element; and
   a first coil connected to the first and second switch elements; and
a resonant inverter including:
   a third switch element and a fourth switch element that are alternately turned on and off;
   a first capacitor and a second capacitor connected in parallel to the third switch element and the fourth switch element, respectively;
   a first inverter section constituted by the third switch element and the first capacitor, the first inverter section including a first resonant circuit constituted by the first coil and the first capacitor; and
   a second inverter section constituted by the fourth switch element and the second capacitor, the second inverter section including a second resonant circuit constituted by the first coil and the second capacitor,
wherein when a drive frequency for driving the third switch element or the fourth switch element is denoted by Fs, a drive frequency for driving the first and second switch elements is 2Fs.

18. A switching power supply device comprising:
the resonant converter according to claim 17;
a resonant rectifier connected to the resonant converter;
a voltage detection circuit that detects an output voltage of the resonant rectifier;
a hysteresis comparator that outputs a control signal for driving the first and second switch elements when a detected value of the output voltage reaches a first threshold, and outputs a control signal for stopping the first and second switch elements when the detected value reaches a second threshold; and
a drive circuit that controls the first and second switch elements in accordance with the control signal.

* * * * *